March 18, 1958     J. N. SCHNEIDER     2,826,959
DIRECTION READING AND MEASURING DEVICE
Filed Feb. 27, 1956
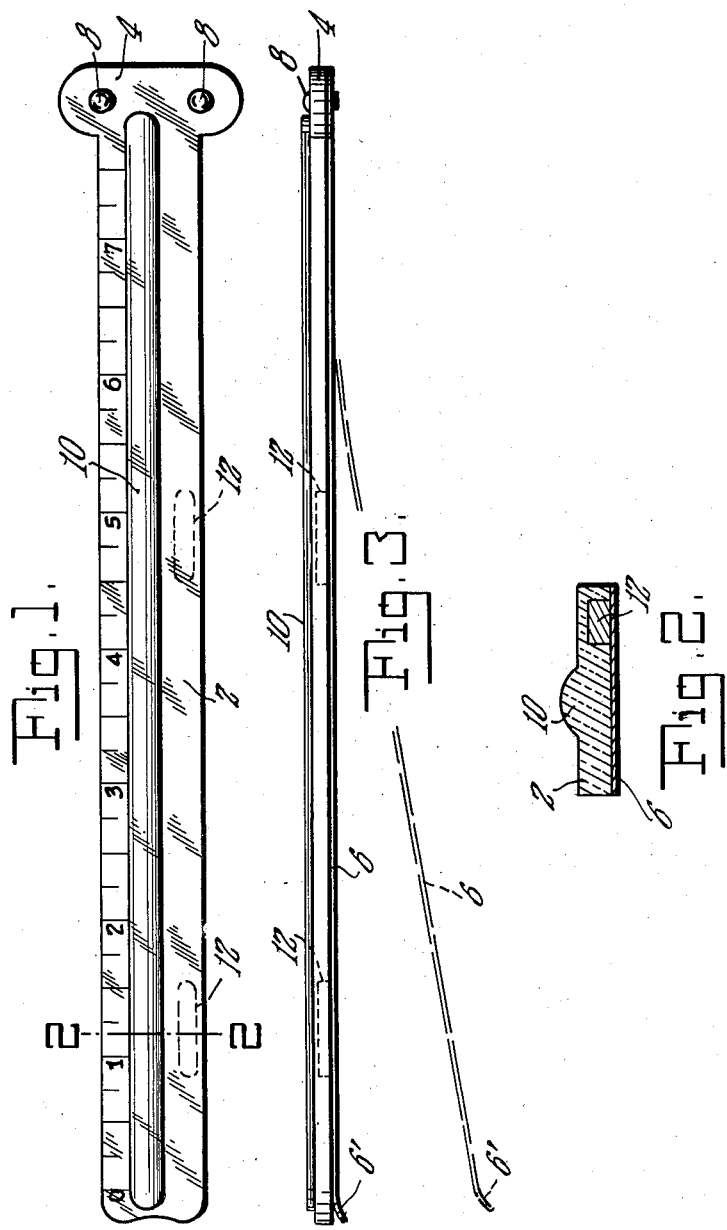
INVENTOR.
John N. Schneider
BY Ross & Ross, Attys.

0
United States Patent Office 2,826,959
Patented Mar. 18, 1958

2,826,959

DIRECTION READING AND MEASURING DEVICE

John N. Schneider, Chester, Conn., assignor to C. J. Bates & Son, Chester, Conn., a firm composed of Wells C. Bates and Hamilton C. Bates, Jr.

Application February 27, 1956, Serial No. 567,906

2 Claims. (Cl. 88—39)

This invention relates to improvements in reading guide device for use in knitting and the like.

The reading guide device of the invention is constructed and arranged to assist in reading directions and patterns used in knitting operations and the like by those knitting or performing operations from written or printed directions and is characterized by means for measuring the work.

According to novel features of the invention, the device includes an elongated body having a longitudinal magnifying zone on the upper side thereof and an elongated flexible holding member beneath the body which is secured at one end to an end of the body with a scale along at least one edge of the body.

The holding member is flexible to facilitate directions and other printed written matter being inserted beneath the body. Magnet means associated with the body attracts the holding member so that printed matter or the like is held between the holding member and body. The magnifying zone of the body enlarges the characters on the printed matter to facilitate ease in reading.

In connection with hand knitting and other operations, the knitter often follows prepared directions or patterns which are frequently difficult to read. By means of the device a sheet or the like is easily and readily inserted beneath the body so that printed matter or characters are clearly observed at an enlarged scale through the magnifying zone. And as the work proceeds, the sheet may be moved progressively between the body and holder.

The present preferred embodiment of the invention is shown in the accompanying drawings wherein:

Fig. 1 is a plan view of the reading guide of the invention;

Fig. 2 is a sectional elevational view on the line 2—2 of Fig. 1; and

Fig. 3 is a side elevational view of the guide shown in Fig. 1.

Referring to the drawings more in detail the novel features of the invention will be fully described.

The device of the invention includes an elongated body 2 having a head 4 at one end thereof and a holder 6 of the same general shape as the body. The heads of the body and holder are secured together in some suitable manner as by rivets 8.

The body will be formed from transparent material such as suitable plastic, glass or the like and has a longitudinal convex portion 10 therealong on the the upper side thereof and intermediae opposite side edges.

The convex portion 10 will be such as to function to magnify written or printed matter against the lower side of the body. The upper face of the body other than the convex magnifier may be made dull or more or less frosted if desired.

The holder 6 will be formed from relatively thin flexible metal so that it may be swung away from or separated from the underside of the body for the insertion of material, such as directions, between the holder and body. Said holder will be formed from material to be attracted by magnet means.

Magnet means such as a magnet or magnets 12 are imbedded in the body and are such as to attract the holder 6 to the body. Thus directions or the like are held against the underside of the body by the holder which is held in place by the magnet means.

The magnifying zone of the body makes it possible to readily and easily read matter on a sheet held beneath the body and said sheet may be moved along beneath the body as may be desired.

The end of the holder is turned downwardly at 6' to facilitate swinging of the holder from the body by manually engaging the portion 6'.

A scale is provided along at least one edge of the body on the upper face thereof as shown. This is adapted for measuring portions of the work performed by the user of the device.

The device may be made in various dimensions as may be desired and changes may be made without departing from the spirit and scope of the invention.

As will be observed the holder is readily flexed away from the lower face of the body for the insertion of a direction sheet between the holder and body. When released the holder is such as to swing towards the lower face of the body and is attracted thereto by the magnet means so that a sheet or the like is releasably held in place.

The magnifying zone makes reading of directions or characters an easy task and the material between the body and holder may be readily and easily shifted along.

What I desire to claim and secure by Letters Patent of the United States is:

1. A device of the class described comprising in combination, an elongated body formed from plastic material to have a flat lower face and an upper face provided with a magnifying zone integral therewith, said magnifying zone extending longitudinally of and intermediate opposite longitudinal edges of said upper face and being transversely convexed and of relatively less transverse width than said face, an elongated relatively thin and flexible metal holder adjacent the lower face of the body, one end of said holder being contiguous with—and secured to one end of the lower face of the body for flexing of the holder outwardly of said one end thereof towards and away from said lower face for insertion of sheet material between said holder and face and holding said sheet material against said face by the holder, and magnet means embedded in said body adapted to attract said holder to said face.

2. A device of the class described comprising in combination, an elongated body formed from plastic material to have a flat lower face and an upper face provided with a magnifying zone integral therewith, said magnifying zone extending longitudinally of and intermediate opposite longitudinal edges of said upper face and being transversely convexed and of relatively less transverse width than said face, an elongated relatively thin and flexible metal holder adjacent the lower face of the body, one end of said holder being contiguous with—and secured to one end of the lower face of the body for flexing of the holder outwardly of said one end thereof towards and away from said lower face for insertion of sheet material between said holder and face and holding said sheet material against said face by the holder, and magnet means embedded in said body adapted to attract said holder to said face, the end of said holder opposite to said one end thereof being turned away from the lower face of the body for manual engagement to flex said holder away from said lower face.

References Cited in the file of this patent
UNITED STATES PATENTS

| | | |
|---|---|---|
| 1,169,492 | Kaufmann | Jan. 25, 1916 |
| 2,448,611 | Martin | Sept. 7, 1948 |
| 2,527,071 | Pierce | Oct. 24, 1950 |
| 2,736,097 | Coleman | Feb. 28, 1956 |